United States Patent
Pereira et al.

(10) Patent No.: US 9,908,194 B2
(45) Date of Patent: Mar. 6, 2018

(54) METHOD FOR ESTABLISHING A PERMANENT BOND BETWEEN A FERROUS ALLOY AND AN ALUMINIUM OR AN ALUMINIUM ALLOY

(71) Applicant: THALES, Courbevoie (FR)

(72) Inventors: Alberto Pereira, Sillans (FR); Thierry Favre-Verand, Pin (FR)

(73) Assignee: THALES, Courbevoie (FR)

( * ) Notice: Subject to any disclaimer, the term of this patent is extended or adjusted under 35 U.S.C. 154(b) by 317 days.

(21) Appl. No.: 14/783,404

(22) PCT Filed: Apr. 9, 2014

(86) PCT No.: PCT/EP2014/057208
§ 371 (c)(1),
(2) Date: Oct. 8, 2015

(87) PCT Pub. No.: WO2014/167027
PCT Pub. Date: Oct. 16, 2014

(65) Prior Publication Data
US 2016/0031028 A1 Feb. 4, 2016

(30) Foreign Application Priority Data
Apr. 12, 2013 (FR) .................................. 13 00862

(51) Int. Cl.
*B23K 1/005* (2006.01)
*B23K 1/19* (2006.01)
*B23K 26/32* (2014.01)
*B23K 26/323* (2014.01)
*B23K 1/00* (2006.01)
(Continued)

(52) U.S. Cl.
CPC .......... *B23K 1/0056* (2013.01); *B23K 1/0008* (2013.01); *B23K 1/19* (2013.01); *B23K 26/206* (2013.01); *B23K 26/244* (2015.10); *B23K 26/32* (2013.01); *B23K 26/323* (2015.10); *B23K 2203/02* (2013.01); *B23K 2203/08* (2013.01); *B23K 2203/10* (2013.01); *B23K 2203/20* (2013.01); *B23K 2203/50* (2015.10)

(58) Field of Classification Search
CPC . B23K 1/00; B23K 1/19; B23K 26/32; B23K 26/323
USPC ............ 219/121.61, 121.64, 121.66, 121.83; 228/262.43, 262.44; 148/525, 531
See application file for complete search history.

(56) References Cited

U.S. PATENT DOCUMENTS 4,750,947 A * 6/1988 Yoshiwara ............. B23K 26/34
148/512
2007/0007254 A1* 1/2007 Wang ................... B23K 11/061
219/91.22

FOREIGN PATENT DOCUMENTS

JP 2923621 B2 7/1999
JP 2004-174529 A 6/2004
(Continued)

*Primary Examiner* — Samuel M Heinrich
(74) *Attorney, Agent, or Firm* — Baker & Hostetler LLP

(57) ABSTRACT

A process for establishing a permanent bond between a first part made of a ferrous alloy and a second part made of aluminum or of an aluminum alloy, comprises: a step of stacking a plurality of parts comprising the first part and the second part; and a heating step in which the heat produced by a heat source is transmitted to the second part through the first part, the heating step being carried out so as to cause the bond to be established between the first part and the second part by melting at least one of the stacked parts.

12 Claims, 2 Drawing Sheets

(51) Int. Cl.
  *B23K 26/20* (2014.01)
  *B23K 26/244* (2014.01)
  *B23K 103/20* (2006.01)
  *B23K 103/08* (2006.01)
  *B23K 103/00* (2006.01)
  *B23K 103/02* (2006.01)
  *B23K 103/10* (2006.01)

(56) References Cited

FOREIGN PATENT DOCUMENTS

| | | |
|---|---|---|
| JP | 2005-169418 A | 6/2005 |
| JP | 2006-175503 A | 7/2006 |
| JP | 2010-094701 A | 4/2010 |
| JP | 2012-166270 A | 9/2012 |
| WO | 2007/071121 A1 | 6/2007 |

* cited by examiner

METHOD FOR ESTABLISHING A PERMANENT BOND BETWEEN A FERROUS ALLOY AND AN ALUMINIUM OR AN ALUMINIUM ALLOY

CROSS-REFERENCE TO RELATED APPLICATIONS

This application is a National Stage of International patent application PCT/EP2014/057208, filed on Apr. 9, 2014, which claims priority to foreign French patent application No. FR 1300862, filed on Apr. 12, 2013, the disclosures of which are incorporated by reference in their entirety.

FIELD OF THE INVENTION

The field of the invention is that of joints, i.e. the establishment of permanent bonds between materials that exhibit a poor metallurgical compatibility on passing into the liquid state, in particular ferrous alloys and aluminum or aluminum alloys.

BACKGROUND

A process for establishing a permanent bond between a first part made of a ferrous alloy and a second part made of aluminum or of an aluminum alloy is known, this process comprising:
- a step of stacking the first part and the second part; and
- a heating step in which the heat produced by a heat source is transmitted to the first part through the second part, which is made of aluminum or an aluminum alloy, the heating step being carried out so as to cause the bond to be established between the first part and the second part by melting at least one of the parts forming the stack.

However, this process has the drawback of requiring a lot of thermal energy to heat the ferrous alloy. Moreover, this process has the drawback of generating substantial deformation of the part made of aluminum or aluminum alloy.

SUMMARY OF THE INVENTION

The aim of the invention is to remedy the aforementioned drawbacks.

For this purpose, the subject of the invention is a process for establishing a permanent bond between a first part made of a ferrous alloy and a second part made of aluminum or of an aluminum alloy, comprising:
- a step of stacking the first part and the second part; and
- a heating step in which the heat produced by a heat source is transmitted to the second part through the first part, the heating step being carried out so as to cause the bond to be established between the first part and the second part by melting at least one part forming the stack.

In other words, the second part is heated by transparency through the first part.

This process makes it possible to save energy because a ferrous alloy absorbs and transmits heat better than aluminum, which is very reflective. Heating the aluminum through the ferrous alloy makes it possible to avoid the deformation of the aluminum caused by the surplus thermal energy that is required if the ferrous alloy is heated by transparency through the aluminum. It also makes the process more easily repeatable.

The bond obtained by this process may be a weld or of the reactive wetting type for example.

In one preferred embodiment of the invention, in the stacking step, a third part made of a metallic filler material, which part is intended to establish the bond between the first part and the second part, is interposed between the first part and the second part, and in the heating step, the heat produced by the heat source is transmitted to the second part and to the third part through the first part, the third part being chosen and the heating step being carried out so as to establish the bond between the first part and the second part by braze-welding.

With this process a weld type bond is obtained at the interface between the second part and the filler material and a braze type bond is obtained between the first part and the filler material.

It should be understood that the poor metallurgical compatibility and the large difference in thermal expansion and elastic modulus between these materials makes it difficult to obtain a mechanically solid joint that is a fortiori vacuum tight. The large difference in mechanical properties generates substantial thermal stresses and therefore a substantial risk of deformation, of breakage and of residual tensions. The poor metallurgical compatibility between these materials and notably the substantial difference between their respective melting points is the origin of thick layers of intermetallic compounds that are very hard and fragile and very prejudicial to the mechanical strength of the joint and a fortiori to its vacuum tightness.

Heating the aluminum and the filler material through the ferrous alloy makes it possible to improve the mechanical strength and vacuum tightness of the joint notably by limiting the thickness of the intermetallic layers relative to those obtained by means of processes in which the bond between the ferrous alloy and the aluminum or aluminum alloy is established by welding, brazing or reactive wetting.

Implementing the process according to the embodiment described above allows joints having an initial leakage rate lower than $1 \times 10^{-10}$ mbar·l/s (1 bar=$10^5$ Pa) and a tear strength of 2500 daN at a temperature of about 20° C. and at atmospheric pressure to be obtained, which is not possible when the bond is produced by welding, brazing or reactive wetting. The Applicant has obtained leakage rates comprised between $1 \times 10^{-12}$ and $9 \times 10^{-11}$ mbar·l/s at a temperature of about 20° C. and at atmospheric pressure.

Using a third part sandwiched between the first and second parts to establish the whole bond between the first part and the second part makes it possible to ensure that the joint is produced by braze-welding and to ensure the uniformity (i.e. to limit the porosity) of the bond bead between the parts. The bead obtained is uniform from the point of view of the metallurgical compound and continuous.

Moreover, this process, because it limits the porosity of the layers binding these two parts, makes it possible to prevent particles from passing through the joint or to prevent particles from detaching from the joint and (in particular on the side of the braze) passing through the joint. This feature is of strategic importance when the joint is intended to form a portion of a vacuum tube that must in no case be contaminated by exterior particles. Sandwiching the third part between the two parts to be joined makes it possible to limit the size of the joint obtained and prevents space being taken up on the sides of the join. This configuration makes it possible to limit the energy required to melt the filler material and to form the bond since that portion of the filler material which is intended to form the bond between the first part and the second part is already located at the interface between the two parts to be joined and in line with the supply of thermal energy. The presence of the filler material part before welding at the interface between the two parts also makes it possible to guarantee that the bond is established and to limit the porosity of this bond. The molten filler material does not have to migrate into the interstice between the two parts to establish the bond, migration not guaranteeing that the interstice will be filled. This configuration also makes it possible to guarantee that the bond will be in the correct position.

Transmitting the heat through the steel makes it possible to produce the joint even when the third part is relatively inaccessible. This feature is important notably when the bond to be produced forms a closed loop. It avoids having to turn around the part in order to join the parts. The space required to implement the process according to the invention is minimized because the bond may be produced by irradiating the part from only one side in line with the bond to be produced.

Advantageously, the stacked parts are held in contact during the heating step.

Advantageously, the stacked parts are held in contact over the entire length and/or the entire width of the bond required to be established during the heating step.

Advantageously, a thermal insulator is held in contact with at least one part chosen from the first part and the second part, during the heating step.

Advantageously, the thermal insulator is interposed between the stacked parts and a tool holding the stacked parts in contact so as to limit the transmission of heat from the stacked parts to the tool.

Advantageously, the thermal insulator is made of zirconium silicate.

Advantageously, the bond takes the form of a closed loop.

Advantageously, in the heating step, the heat source scans the bond required to be formed over more than one circuit of the bond while moving relative to the bond in a single direction. Carrying out the heating over more than one circuit makes it possible to improve the uniformity of the temperature over the entirety of the bond. This makes it possible to further improve the gas tightness of the bond.

Advantageously, prior to the heating step, a preheating step is carried out consisting in preheating the stacked parts by means of the heat source so as to raise the stacked parts to respective temperatures below their respective melting points. The same heat source may be used for the preheating step and for the heating step.

Advantageously, the heat source scans more rapidly the bond to be produced in the heating step than in the preheating step or scans the bond with a scan speed equal to the slowest scan speed used in the preheating step.

Advantageously, the heat source is a laser, for example a YAG laser, a fiber laser or a laser diode.

BRIEF DESCRIPTION OF THE DRAWINGS

Other features and advantages of the invention will become apparent on reading the following detailed description, which is given by way of nonlimiting example and with reference to the appended drawings, in which.

From one figure to another, the same elements are referenced by the same references.

DETAILED DESCRIPTION

Figure 1:
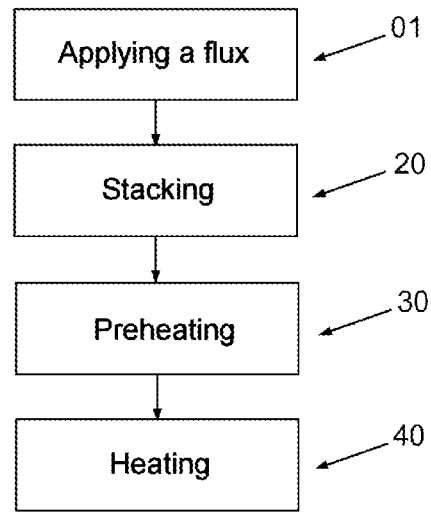
FIG. 1 shows a flow chart of the steps of the process according to invention.

FIG. 1 shows a flow chart of the steps of the process according to the invention.

The process comprises a step 20 of stacking a plurality of parts comprising a first part 1 (shown in FIG. 2) made of a farrier alloy and a second part 2 made of aluminum or aluminum alloy. The first part 1 is made of a ferrous alloy, for example, of steel or stainless steel. The second part 2 is made of aluminum or of an aluminum alloy. The second part 2 has a melting point below the melting point of the first part 1. In other words, the material from which the second part is made has a melting point lower than that of the material from which the first part is made.

This stack may or may not comprise a metallic filler material, also referred to as a filler metal. Advantageously, in the step of producing the stack, a third part 3 made of a filler material, which part is intended to establish the bond between the first part 1 and the second part 2, is interposed between the first part 1 and the second part 2, as may be seen in FIG. 2. The third part is a single piece.

The filler material has a melting point below the melting point of the first part and of the second part. It has a lower chemical affinity than the second part has to the first part. The metallic filler material is, for example, an alloy of aluminum preferably with silicon. The aluminum alloy may also be an alloy with copper, manganese or zinc. It may take the form of a wire, film, sheet or ring. The ring may be various shapes, for example square or round. It is a question, in other words, of a closed loop.

Advantageously, the faces of the third part 3 that face the first part 1 and the second part 2, respectively, are complementary to the respective faces of the first part and second part that they face. In the embodiment in FIG. 1, these faces are planar. This feature makes it possible to produce a bond between the first part 1 and the second part 2 over the entire facial width of the third part 3.

The process comprises a heating step 40 in which the heat produced by a heat source 4 is transmitted to the second part 2 through the first part 1, the heating step 40 is carried out so as to join the first part 1 and the second part 2 by melting at least one of the parts of the stack. In other words, in the heating step, the heat source heats the first part to a temperature chosen so as to melt at least one of the parts and establish the bond. The heat source heats only the first part and the heat produced is transmitted to the other parts. If the heat source is a laser, the laser only irradiates the first part. In the configuration without filler material, the bond may be produced by welding or reactive wetting or brazing.

Figure 2:
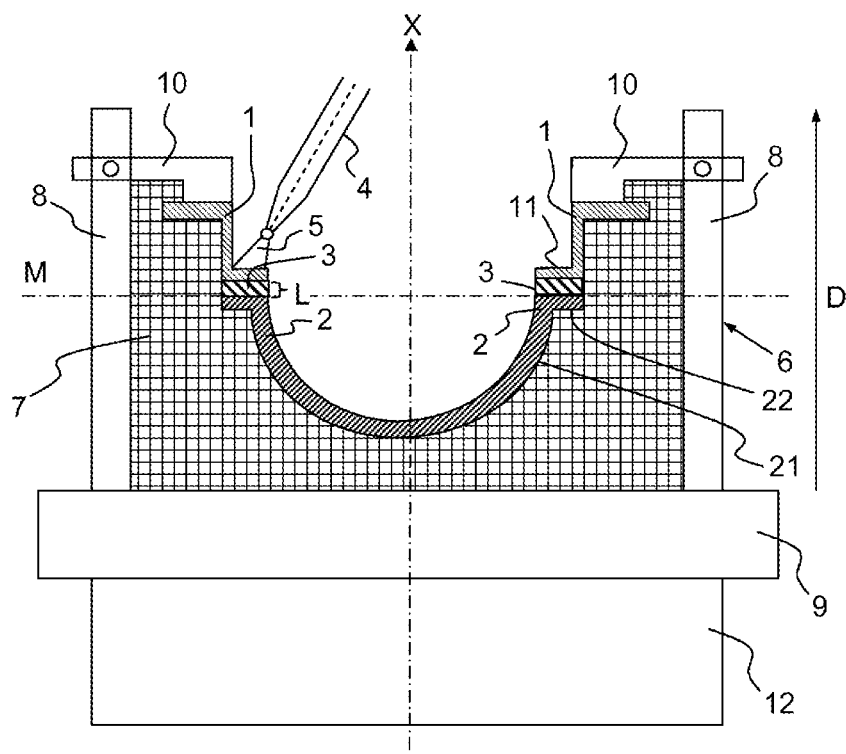
FIG. 2 schematically shows an exemplary embodiment of the process according to the invention during a preheating or heating step, in which are shown the heat source and a cross section through the stacked parts making contact with an insulator and compressed by a tool.

The heat source 4 is, for example, a laser as in FIG. 2, for example an Nd-YAG laser, a $CO_2$ laser or a laser diode. A laser diode is preferably used because the thermal absorption coefficients of aluminum and iron are higher at wavelengths shorter than 1.06 microns at which a laser diode may emit. The laser 4 irradiates the first part 1 made of ferrous alloy by means of a laser beam 5.

The heat source could also be an electrode for TIG welding.

In the configuration with filler material 3, in the heating step 40, the heat produced by the heat source 4 is transmitted to the second part 2 and to the third part 3 through the first part 1, the third part 3 being chosen and the heating step 40 being carried out so as to form the permanent bond between the first part and the second part by braze-welding. The properties of the filler material were given above. The heating step is carried out so as to raise the part 3 to a temperature at least equal to its melting point so as to make it melt, but so as to raise the first and second parts 1, 2 to temperatures below their respective melting points.

Advantageously, the stacked parts are held in contact one against the other during the heating step 40. In other words, in the embodiment in FIG. 2, each of the two parts 1, 2 is held in contact with the filler material 3. Holding the parts pressed together makes it possible to limit the porosity between the two parts 1, 2 during the braze-welding, notably on the braze side, and therefore to improve the seal tightness of the joint obtained.

Advantageously, the stacked parts are held in contact over the entire length of the bond L required to be established and preferably over the entire width of the bond required to be established between the two parts. The length and width of the bond L extend perpendicularly to the stacking direction D of the parts. When the bond has a closed-loop shape, the length corresponds to the circumference of the loop. This makes it possible to further limit porosity and limit as much as possible the passage of particles through the stack.

The parts are held in contact by means of a tool 6 exerting stresses in the same direction and in the opposite direction on either side of the stacked parts 1, 2, 3, in the stacking direction D so as to hold them in contact. The pressure is advantageously maintained throughout the heating step 40. The tool 6 advantageously applies a constant compressive stress to the stacked parts during the heating step.

In the embodiment in FIG. 2, the tool 6 is a system of chords 8 extending in the stacking direction D and fastened to a supporting member 9 on which the stack is placed and to crosspieces 10 bearing against that face of the stack which is opposite the supporting member 9. The length of the chords 8 may be adjusted so as to compress the stack. Decreasing the length of the chords brings the supporting member 9 and the crosspieces 10 closer together, thereby having the effect of compressing the stack in the direction D. The system for adjusting the chords is, for example, pneumatic.

Advantageously, a thermal insulator 7 is held in contact with a least one part among the first part 1, the second part 2 and the third part 3 (in the case where a filler material is used) during the heating step. This contact is advantageously maintained throughout the heating. This feature makes it possible to prevent the parts from cooling in the heating step and therefore fragile joints from being obtained.

In the embodiment in the figures, the faces of the first, second and third parts that are opposite the heat source 4 are held in contact with the thermal insulator. The insulator 7 advantageously has a shape that is complementary to the face opposite the heat source 4 of the stacked parts (or the first and second parts when no third part is used). The stacked parts are fitted into the insulator 7.

Advantageously, the insulator 7 is interposed between the stacked parts 1, 2, 3 and the tool so as to limit the transmission of heat from the stacked parts to the tool. This makes it possible to prevent the temperature of the stacked parts from dropping. Moreover, in this case, the thermal insulator 7 is held in contact with the parts at the same time as the parts are held in contact. This makes it possible to use a single tool for this step.

The thermal insulator 7 is advantageously made of a ceramic. The ceramic is advantageously made of zirconium silicate $ZrSiO_4$. This ceramic is advantageous because it is both insulating and resistant to these compressive stresses. It moreover has a melting point of about 1660° C., i.e. above the melting point of the filler material, and a thermal conductivity of 3.5 W $W \cdot m^{-1} \cdot K^{-1}$.

Advantageously, but not necessarily, a flux is applied in prior step 01 to the stack, to at least one part from the first and second. The flux makes it possible to avoid surface oxides and allows a better wetting of the first and second parts to be obtained. It makes it possible to obtain a process that is more robust from the point of view of vacuum resistance and from the point of view of the leakage rates of the joints obtained. The flux is for example based on potassium aluminum fluoride ($KF+AlF_3$).

Advantageously, but not necessarily, the stack is inerted during the heating step and preferably throughout the heating step 40. The inerting may, for example, be carried out, nonlimitingly, using argon or an argon/helium mixture. This inerting makes it possible to prevent oxidation and to limit the affinity of oxygen to the aluminum.

Figure 3:
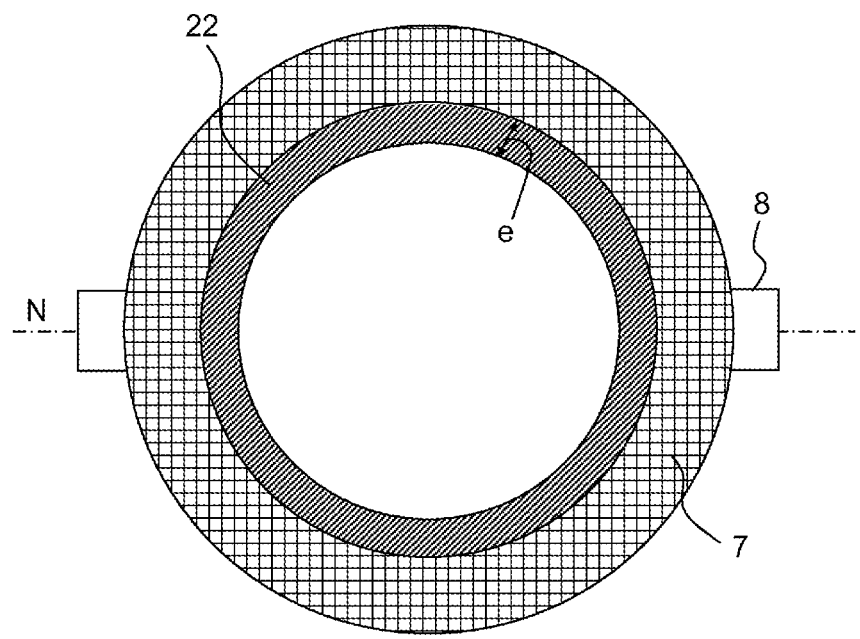
FIG. 3 schematically shows a cross section in a plane M, of the situation shown in FIG. 2.

As may be seen in FIG. 3, showing a cross section through the second part 2 in the plane M shown in FIG. 2, and in FIG. 2, showing a cross section through the elements employed in the process during the implementation of the process, the cross-sectional plane being the plane N shown in FIG. 3, the second part 2 comprises a dome 21 and a base 22 having a ring shape. The seal-tight bond L must be established between this base 22 and a portion 11 of the first part 1 having the same ring shape. The third part 3 has the same ring shape i.e. an annular or hoop shape. The bond between the two parts must therefore be established all the way around the circumference of the rings 11 and 22, which is the length of the bond, and advantageously over the entirety of their width e perpendicular to the direction of the stack.

In other words, the bond 2 required to be established between the two parts 1, 2 takes the form of a closed loop. This feature makes it possible to ensure the seal tightness of the bond, notably between the interior of the loop (portion of the stack encircled by the loop) and the exterior of the loop (portion encircling the loop). The closed loop is round in the embodiment in the figures but could be another shape, for example a polygonal shape, square or rectangular for example. In the embodiment in which a filler material is used, the part 3 advantageously has a shape of identical cross section to the bond required to be formed. Here it is question of a ring.

In this case, in the heating step 40, the heat source scans the bond required to be formed, via the first part 1, over more than one circuit of the bond while moving relative to the bond in a single direction. The movement is carried out along the circumference of the bond to be formed. In other words, the heating is carried out in more than one pass, in one direction of relative movement between the heat source and the bond.

When the heat source is a laser 4, the laser 4 produces a laser beam 5 that irradiates the first part 1 in line with the bond required to be formed, preferably, over the entire width of the bond required to be formed via a relative movement between the heat source and the stacked parts so that the heat source makes, in a single direction, more than one circuit of the bond. In this case, the beam has a substantially linear cross section oriented linearly along the width of the bond (here corresponding to the width e of the ring 22).

When a filler material is used, the heat source makes more than one circuit of the filler material.

Making more than one circuit of the bond to be produced makes it possible to prevent problems with the seal tightness of the bond that could arise if the beam made exactly one circuit of the part at the start and end point because of nonuniform melting of the filler material.

Advantageously, the process comprises, prior to the heating step 40, a step 30 of preheating the stacked parts by means of the heat source 4 so as to raise the stacked parts to temperatures below their respective melting points. In this step, as in the heating step, the heat produced by a heat source 4 is transmitted to the second part 2 through the first part 1. In other words, the heat source heats only the first part and the heat produced is transmitted to the other parts. Advantageously, the same heat source may be used for the preheating step 30 and for the heating step 40. If the heat source is a laser, the laser irradiates only the first part.

This step makes it possible to warm the stack before the thermo-welding (or heating 40) step and to improve the thermal efficiency of the process, i.e. the absorption of heat by the materials. Moreover, the fact that this step is carried out by means of the heat source used for the heating step makes it possible to avoid the use of additional devices and notably metal tools that would form thermal bridges.

Advantageously, the preheating step 30 is carried out in a plurality of successive passes intended to raise the stacked parts to respective successive temperatures each of which is higher than the last. In other words, the irradiated face of the first part 1 is raised to successive temperature plateaus each of which is higher than last and chosen so as not to reach the melting points of the various parts. Each pass corresponds to the completion, by the heat source, of one circuit of the bond required to be produced, the beam irradiating, preferably, the first part over the entire width of the bond required to be produced in line with the latter. This step makes it possible to improve the absorption of heat by the stack and the transparency of the first part 1 because it blackens. The thermal efficiency of the process is therefore higher than if only a single pass were used. This step also makes it possible to make the process repeatable, the quality of the bonds obtained being uniform.

Advantageously, the temperature of the irradiated surface of the first part is fed back so that during the heating the temperature of the irradiated surface reaches successive plateaus each of which is higher than the last. This temperature is measured by means of a pyrometer. The power of the laser may also be controlled during the heating.

Advantageously, the compression of the stack and/or the inerting are implemented throughout the preheating step 30.

Advantageously, the pass made in the heating step is carried out more slowly than the passes carried out in the preheating step or with a scan speed equal to the slowest scan speed used for the passes carried out in the preheating step. This makes it possible to go more slowly and enables a better wettability of the first part, better melting of the third part and the thermal stresses in the third part during its cooling to be limited but also makes it possible to significantly decrease the laser power to be applied to the first part.

Advantageously, the heat source 4 remains stationary and the stack moves relative to the heat source in order to make the passes. This embodiment has the advantage of being simpler to implement than a process in which the source moves relative to the stack above all in the case where the bond to be established has a loop shape.

In the embodiment in the figures, the bond to be established has a circular shape. The laser 4 remains stationary and the stack pivots about an axis that is the axis of symmetry of the bond required to be established. For this purpose, the stack is installed on a turntable 12 that is able to pivot about an axis X.

The preheating step for example comprises four successive elementary preheating steps achieved by a relative rotation of the heat source and the stacked parts at respective speeds of relative rotation between the source and the stacked parts about the axis X equal for example at 10°/s, 8°/s, 6°/s and 4°/s (by °/s what is meant is degrees per second) in one direction at constant laser power and the heating step is carried out with a speed of relative rotation identical to the speed of the last elementary preheating step, i.e. here at 4°/s, with regulation of the laser power so as to produce the bond between the parts 1 and 2, for example, depending on the temperature read on the surface of the part 1. During each elementary preheating step and during the heating step, the source makes a circuit of the bond to be produced plus a portion of 10° of the circuit of the bond to be produced. In other words, advantageously, the preheating step comprises a plurality of successive preheating steps. In each elementary preheating step, more than one pass and, preferably, one pass plus one pass portion, is made in a single direction. Also, more than one pass, and preferably more than one pass plus one pass portion, is made, in a single direction, in the heating step.

Advantageously, the laser beam 5 is inclined by an angle comprised between 5° and 15° and preferably equal to 10° relative to the normal to the surface of the first part 1 that faces it. This feature makes it possible to improve the absorption of the heat produced by the laser beam by the first part 1.

The Applicant has produced a stack based on aluminum, stainless steel and a third part taking the form of a flat ring made of an alloy of aluminum and silicon (composition by weight of Si between 11 and 13%) by bringing the irradiated face to successive temperatures of 400° C., 500° C. and 700° C. in the preheating step and to a temperature of 800° C. in the heating step during in one circuit and 10° of overlap. A joint having a vacuum resistance lower than or equal to $1\times10^{-10}$ mbar, a leakage rate lower than or equal to $1\times10^{-10}$ mbar·l/s and a tear strength comprised between 3500 daN and 5000 daN at room temperature was obtained.

The use of a laser is advantageous because it is a point source of thermal energy that limits the deformation of the heated parts and prevents the need for a step of rectifying the shape of the joints obtained.

The invention claimed is:

1. A process for establishing a permanent bond between a first part made of a ferrous alloy and a second part made of aluminum or of an aluminum alloy, the bond takes the form of a closed loop, the process comprising:
   a step of stacking a plurality of parts comprising the first part and the second part; and
   a heating step in which the heat produced by a heat source is transmitted to the second part through the first part, the heating step being carried out so as to cause the bond to be established between the first part and the second part by melting at least one of the stacked parts;
   the process further comprising, prior to the heating step, a preheating step of preheating the stacked parts by the heat source so as to raise the stacked parts to respective temperatures below their respective melting points, the same heat source being used for the preheating step and for the heating step.

2. The process as claimed in claim 1, in which, in the stacking step, a third part made of filler material, which part is intended to establish the bond between the first part and the second part, is interposed between the first part and second part, and in the heating step, the heat produced by the heat source is transmitted to the second part and to the third part through the first part, the third part being chosen and the heating step being carried out so as to establish the bond by braze-welding.

3. The process as claimed in claim 1, in which the stacked parts are held in contact during the heating step.

4. The process as claimed in claim 3, in which the stacked parts are held in contact over the entire length and/or the entire width of the bond required to be established during the heating step.

5. The process as claimed in claim 1, in which a thermal insulator is held in contact with at least one part chosen from the first part and the second part, during the heating step.

6. The joining process as claimed in claim 5, in which the thermal insulator is interposed between the stacked parts and a tool holding the stacked parts in contact so as to limit the transmission of heat from the stacked parts to the tool.

7. The process as claimed in claim 5, in which the thermal insulator is made of zirconium silicate.

8. The process as claimed in claim 1, in which the heat source scans more slowly the bond to be produced in the heating step than in the preheating step or scans the bond with a scan speed equal to the slowest scan speed used in the preheating step.

9. The process as claimed in claim 1, in which the heat source is a laser.

10. The process as claimed in claim 1, in which the bond takes the form of a closed loop.

11. The process as claimed in claim 10, in which, in the heating step, the heat source scans the bond required to be formed over more than one circuit of the bond while moving relative to the bond in a single direction.

12. The process as claimed in claim 9, in which the preheating step is carried out in a plurality of successive passes intended to raise the stacked parts to respective successive temperatures each of which is higher than the last, each pass corresponding to the completion, by the heat source, of one circuit of the bond required to be produced, the beam irradiating the first part over the entire width of the bond required to be produced in line with the latter.

* * * * *